US007280994B2

(12) United States Patent
Daum

(10) Patent No.: US 7,280,994 B2
(45) Date of Patent: Oct. 9, 2007

(54) ENHANCED AIR TRAVEL SECURITY METHOD AND APPARATUS

(76) Inventor: Steven Daum, 182 Lonetown Rd., Redding, CT (US) 06896

( * ) Notice: Subject to any disclaimer, the term of this patent is extended or adjusted under 35 U.S.C. 154(b) by 0 days.

(21) Appl. No.: 11/031,092

(22) Filed: Jan. 7, 2005

(65) Prior Publication Data

US 2005/0138080 A1 Jun. 23, 2005

Related U.S. Application Data

(63) Continuation of application No. 10/056,147, filed on Jan. 24, 2002, now abandoned.

(51) Int. Cl.
*G06K 9/00* (2006.01)

(52) U.S. Cl. ........................ 706/48; 382/117; 382/118; 902/3; 902/5; 902/26

(58) Field of Classification Search ............. 707/104.1; 382/115; 706/48; 340/5.52
See application file for complete search history.

(56) References Cited

U.S. PATENT DOCUMENTS 4,975,969 A * 12/1990 Tal ............................. 382/116
4,993,068 A * 2/1991 Piosenka et al. ............ 713/186
5,914,953 A * 6/1999 Krause et al. .............. 370/392
2002/0105410 A1* 8/2002 Mann ......................... 340/3.3

OTHER PUBLICATIONS

Transportation Security Administration Registered Traveler Pilot Privacy Impact Assessment, Jun. 24, 2004.*

* cited by examiner

*Primary Examiner*—Anthony Knight
*Assistant Examiner*—Nathan H. Brown, Jr.
(74) *Attorney, Agent, or Firm*—Glen M. Diehl; Diehl Servilla LLC

(57) ABSTRACT

A method of screening passengers for a passenger aircraft flight includes a step of obtaining voluntary consent from a plurality of passengers to perform background check. The method further includes formulating a data record associated with each of the plurality of passengers. The passenger aircraft flight is scheduled as one of a plurality of regular scheduled flights. Prior to the passenger aircraft flight, it is determined whether a person is associated with a formulated data record. The method includes denying participation by the person in the passenger aircraft flight if the person is not associated with a formulated data record.

6 Claims, 5 Drawing Sheets

ENHANCED AIR TRAVEL SECURITY METHOD AND APPARATUS

STATEMENT OF RELATED CASES

This application is in continuation of U.S. patent application bearing Ser. No. 10/056,147, filed Jan. 24, 2002 now abandoned, entitled Enhanced Air Travel Security Methods and Apparatus, which is entirely incorporated herein by reference.

FIELD OF THE INVENTION

The present invention relates generally to the purchase and use of aircraft by a plurality of parties.

BACKGROUND OF THE INVENTION

Options available for air travel by business travelers are limited to commercial airlines, aircraft ownership, and chartering. Ideally, frequent business travelers seek comfort as well as an environment in which in-flight productivity is enhanced. Coach class traveling on commercial airlines provides a largely unfavorable environment. However, in exchange for the lack of comfort and amenities, the cost of the flight per passenger is relatively low. In other words, relatively little room is allocated per passenger in order to reduce the cost of the flight per passenger.

Business travelers, however, are often willing to pay an increased price to obtain more space and amenities. The increased space allocated per traveler allows the traveler to emerge from air travel relatively refreshed and potentially more productive on the ground. If some of the increased space is dedicated to productivity enhancing furnishings, then the increased space further increases the potential for air travel time to be useful time.

Travel by first class or business class addresses some of the productivity and comfort concerns with commercial air travel, but only in a marginal way. While the seats in traditional first and/or business class service are slightly larger, and the service is more personal, the effective result is little more than enhanced coach class travel.

An additional perceived drawback to commercial airline travel is the possible safety risks associated with providing light service for the general public on relatively crowded aircraft. While safety regulations and procedures for commercial lights are laudable, such regulations and procedures have limited ability to screen passengers to enhance safety.

One mechanism by which business (and other) travelers obtain enhanced comfort, safety and productivity in flight is through full or fractional ownership of luxury-appointed aircraft. Full ownership of an aircraft provides the greatest flexibility and safety to the owner, but at a great cost. In general, cost may be reduced by purchasing smaller aircraft, however, at the sacrifice of comfort and productivity concerns. Conversely, while a specially designed jumbo jet maybe configured for optimal comfort and productivity, sole ownership of such a jumbo jet is typically not cost justified except in rare circumstances.

Fractional aircraft ownership helps spread the costs of aircraft ownership over several parties. In the existing practice of fractional aircraft ownership, multiple buyers (up to 16) each buy a fraction of an aircraft, collectively purchasing the aircraft. Each buyer then signs an agreement assigning the management of that aircraft to a management company who is also the originator of the fractional jet purchases either directly or indirectly through an affiliate. With conventional fractional ownership and operations, each owner, alone, or with their own employees and guests, may use the plane for up to a specific allotment of hours per year. The amount of annual hours of use are tied to the size of the fraction purchased. Fractional aircraft ownership theoretically provides enhanced safety because a limited group of people have access to the aircraft. However, no significant additional passenger screening occurs.

In accordance with applicable governmental ("FAA") regulations, multiple owners in existing fractional ownership programs cannot use and pay for the use of the aircraft on the same flight. As a result, the cost of use of the aircraft is the same to each owner, regardless of how many passengers the owner flies on the aircraft on any one flight. The consequence of this limitation is that the business model for fractional ownership is somewhat inefficient.

There is a need, therefore, for an arrangement in which travelers may travel in a safe, productive, and comfortable manner while obtaining an efficient cost/benefit ratio.

SUMMARY OF THE INVENTION

The present invention addresses the above needs, as well as others, by providing methods and apparatus for shared fractional ownership of aircraft that use regularly scheduled flights and for which multiple owners may share the costs of individual flights. In particular, by using cost-shared scheduled flights of aircraft owned by fractional owners, each fractional owner of aircraft achieves greater utility for each dollar invested in the aircraft.

In accordance with a safety-oriented aspect of the present invention, the present invention provides for pre-screening approved passengers and maintaining a data file for screened passengers. Upon attempted boarding of an aircraft, a passenger is only allowed to board if the passenger has a data file that indicates a successful pre-screening. Thus, the aircraft is occupied by only pre-screened passengers.

One embodiment of the present invention is a method of screening passengers for a passenger aircraft flight that includes a step of obtaining voluntary consent from a plurality of passengers to perform a background check. The method further includes formulating a data record associated with each of the plurality of passengers. The passenger aircraft flight is scheduled as one of a plurality of regular scheduled flights. Prior to the passenger aircraft flight, it is determined whether a person is associated with a formulated data record. The method includes denying participation by the person in the passenger aircraft flight if the person is not associated with a formulated data record.

Another embodiment of the present invention is an apparatus that includes a memory, a communication device, and a processing circuit. The processing circuit is operable to formulate and store in the memory a data record associated with a first passenger, the data record including an indication that the first passenger has passed a background check, the data record further including biologically oriented identification data associated with the first passenger. The processing circuit is further operable to receive biological oriented measurement data associated with a person and compare the biologically oriented measurement data to the biologically oriented identification data in the data record. The processing circuit is also operable to provide an indication signal to the communication device, the communication signal operable to cause the communication device to provide a human-perceivable indicia representative of the result of the comparison.

Thus, the above-described embodiment employs biologically-oriented identification verification of passengers, preferably pre-screened passengers. The reliance on biologically-oriented information enhances safety because the potential for the successful use of phony or bogus identification cards is greatly reduced.

It will be appreciated that the above-described features and advantages, as well as others, will become more readily apparent to those of ordinary skill in the art by reference to the following detailed description and accompanying drawings.

DETAILED DESCRIPTION

Figure 1:
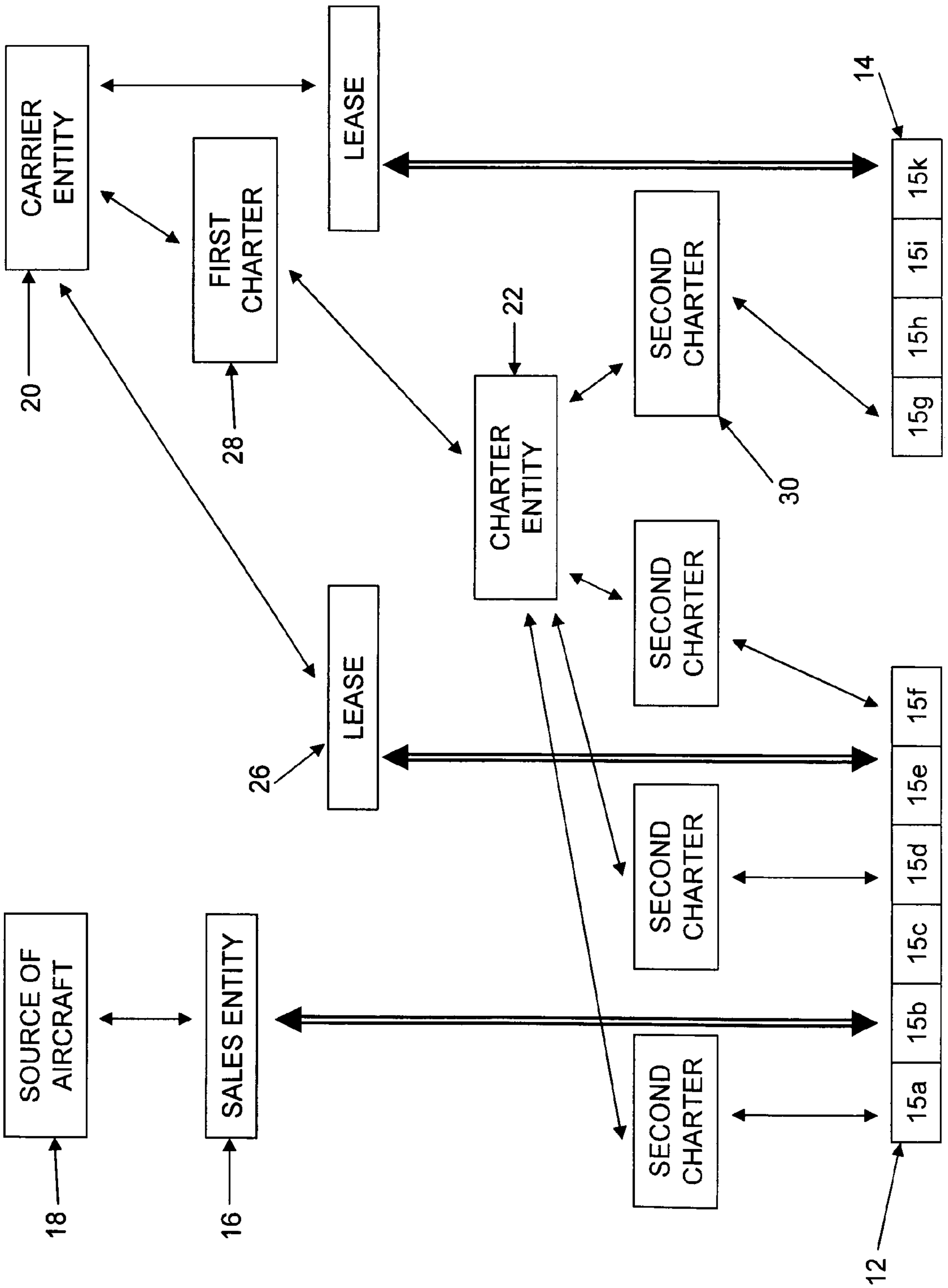
FIG. 1 shows a schematic diagram of relationships between various entities involved in establishing and operating a shared fractional private airline ("SFPA") in accordance with embodiments of the present invention.

FIG. 1 shows a schematic diagram of relationships between various entities involved in establishing a shared fractional private airline ("SFPA") in accordance with embodiments of the present invention. In general, the shared fractional private airline is an associated group of entities that own and operate a number of fractionally-owned aircraft. The schematic diagram of FIG. 1 shows an exemplary arrangement in which first and second fractional owners groups 12 and 14 purchase aircraft and participate in the SFPA. It will be appreciated that even within the exemplary embodiment shown in FIG. 1, the SFPA will typically include several additional fractional owners groups similar to the fractional owners groups 12 and 14.

The first fractional owner group 12 is comprised of a plurality of fractional aircraft owners **15*a* through 15*f*. Each fractional aircraft owner 15*x*** (where x is any of a through *f*) purchases and owns a fraction of a first aircraft (not shown). In accordance with the exemplary embodiment described herein, fractional ownership may be divided into increments of as little as 1/160. Thus, each fractional owner **15*x* may purchase as little as 1/160 of an aircraft, or any fraction greater than 1/160. Preferably the sum of the fractions owned by the fractional owners 15*a* through 15*f*** equals one or nearly one. Thus, for example, the fraction ownership of the first aircraft may be as set forth below in Table 1.

TABLE 1

| Owner | Fraction Owned |
|---|---|
| 15a | 1/16 |
| 15b | 1/32 |
| 15c | 1/64 |
| 15d | 1/64 |
| 15e | 3/8 |
| 15f | 1/2 |

As will be discussed in further detail below, the fraction owned by each fractional owner **15*x* preferably defines the use allocated to the fractional owner, as well as the amount of expenses incurred for the maintenance and operation of the first aircraft. The use allocation identifies the quantity of use allotted to the fractional owner 15*x*: In the embodiment described herein, the "use" allotted to the fractional owner 15*x*** permits the fractional owner to "use" any aircraft in the SFPA, and not just the first aircraft. Thus, the intent is to obtain a relatively large number of fractional owners groups so that the SFPA can offer service on several air routes to any fractional owner.

In accordance with one aspect of the present invention, usage is measured as a function of the number of passengers that are associated with the fractional owner **15*x* that participate in each flight of an aircraft. Thus, for example, a fractional owner 15*x*** that flies two people from New York to Chicago uses twice as much of her use allocation than she would have used to fly one person from New York to Chicago.

As a consequence of incorporating the number of passengers per flight in the use allocation, the fractional owner **15*x* may effectively "split" the cost of the flight, albeit indirectly, with other fractional owners, based on how much of the plane's capacity the fractional owner 15*x*** uses. In other words, if several owners (or their guests or employees) participate in a flight, the use allocation of each fractional owner will be consumed accordingly. As a result, multiple fractional owners are capable of "paying" for a single flight through the consumption of their use allocation.

In the exemplary embodiment described herein, the use allocation is defined as the number of passenger-hours of flight time. However, alternative measures such as passenger flight mileage, a point system based on route, or other measures that approximate usage may be employed.

It will be appreciated that the fractional owner **15*x*** may be an entity that is a living person, a corporation or another type of organization. It will further be appreciated that the SFPA may comprise a single aircraft and a single fractional owners group. However, as discussed above, the benefits of the present invention are greatly enhanced through the inclusion of multiple fractional owners groups and multiple aircraft.

The second fractional owners group 14 has a similar architecture as the first fractional owners group 12. It will be appreciated that the second fractional owners group 14 may comprise a different number of fractional owners, e.g. **15*g* through 15*k***, so long as the owned fractions add up to one or nearly one.

Figure 2:
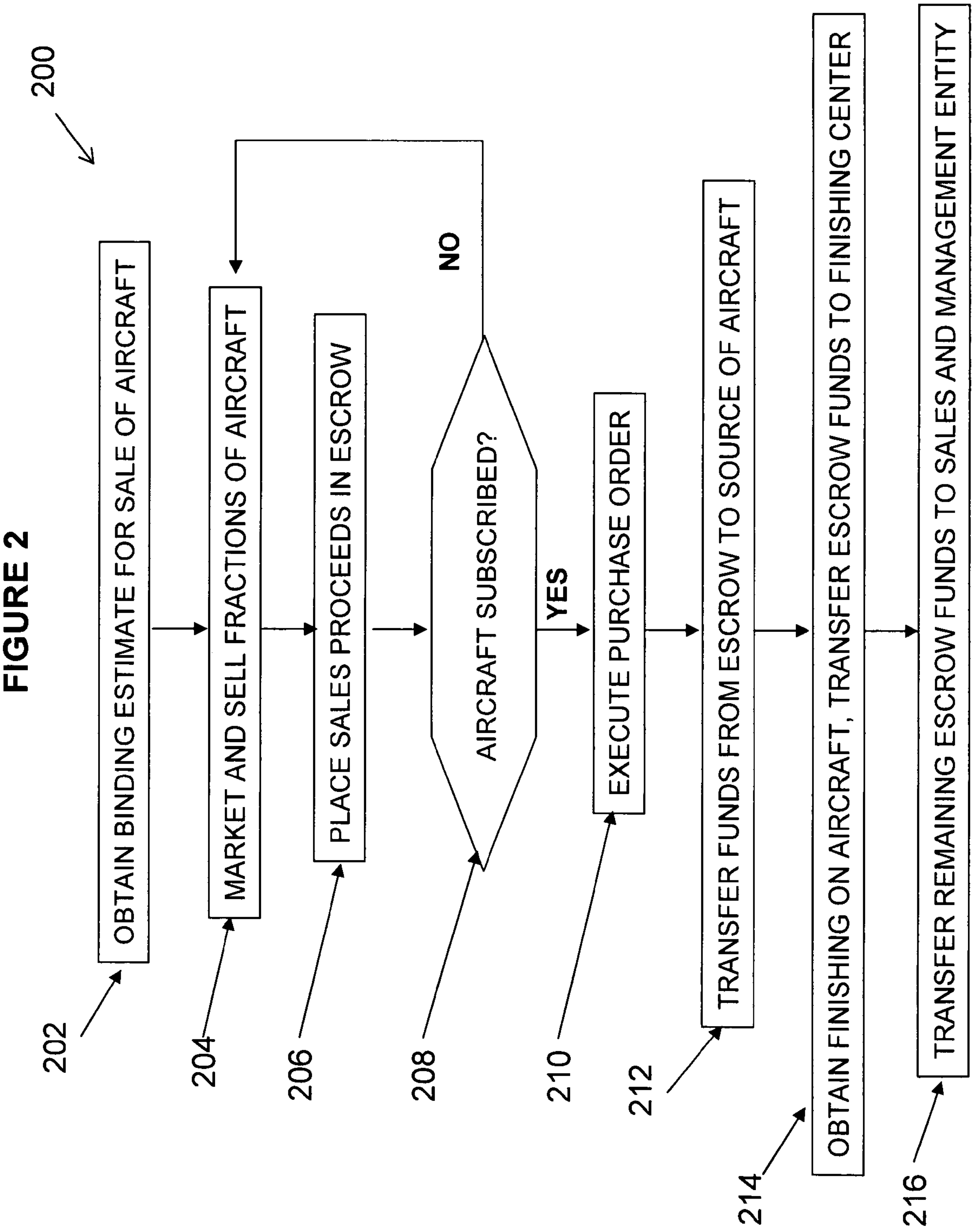
FIG. 2 shows a flow diagram of an exemplary set of operations for coordinating a fractional purchase of an aircraft in accordance with embodiment of the present invention.

A sales and management entity 16 is responsible for arranging the sale of an aircraft from a source of aircraft 18 to the fractional owners groups 12 and 14. FIG. 2, discussed further below, illustrates in detail the operations of the sales and management entity 16 to arrange for the sale. In general, the sales and management entity 16 provides marketing and sales services necessary to "subscribe" each aircraft to full or near full fractional ownership.

Continuing with the description of FIG. 1, the source of aircraft 18 may be an aircraft manufacturer, or may alternatively be a seller of used aircraft, including a commercial airline. In the preferred embodiment described herein, the fractional owner's groups 12 and 14 purchase relatively large jumbo jets, such as the BBJ-2 available from Boeing Corporation. A jumbo jet provides sufficient room for extended business and comfort features envisioned as the norm for the SFPA aircraft.

After the first buyers' group 12 purchases the first aircraft, the maintenance and operation of the first aircraft is provided by the carrier entity 20. To this end, the first buyers' group 12 may transfer possession of the first aircraft to the carrier entity 20, via a lease document 26, discussed below, or through some other mechanism. The carrier entity 20 is an entity having core capabilities of an ordinary commercial or charter airline. The carrier entity 20 hires and maintains flight crews, and maintains aircraft. The carrier entity 20 preferably acts as a FAA part 121 carrier, which operates passenger flights on regular, repeating schedules. By regular, repeating schedules, it is meant that passenger flights are scheduled regularly without regard to prior reservation by passengers.

While the carrier entity 20 flies and maintains the aircraft of the SFPA, the charter entity 22 performs the scheduling, booking and billing operations that enable usage of the aircraft by the fractional owners (e.g. fractional owners 15*a* through 15*k*). The charter entity 22 thus schedules the use of each aircraft owned by the fractional owners groups 12 and 14. The charter entity 22 performs the function of accepting reservations from the individual fractional owners 15*a* through 15*k* (i.e. from the fractional owners' designated agents). The charter entity 22 further performs the function of collecting management fee and occupancy fee payments from the fractional owners 15*a* through 15*k*, as will be discussed further below. The charter entity 22 is also responsible for providing compensation to the carrier entity 20 for the performance of the aircraft operation and maintenance services.

Finally, the charter entity 22 tracks flight occupancy attributable to each fractional owner 15*x* and deducts the fractional owners' use allocation accordingly. Thus, for example, if a fractional owner 15*x* is allocated fifty passenger-hours per year and flies two people on a six hour flight, then the charter entity 22 would reduce the remaining use allocation of the fractional owner 15*x* by twelve, leaving thirty-eight passenger-hours.

In summary, each of the fractional owners groups 12 and 14 purchases an aircraft as a unit. Each fractional owner 15*x* is then entitled to use either of the fractionally owned aircraft. In the exemplary embodiment described herein, it is envisioned that each fractionally owned aircraft will be assigned to one or a few regularly scheduled flights on particular routes (e.g. between one or a few city-pairs). As a result, the number of scheduled flights (and hence the number of air routes serviced) depends upon the number of fractionally owned aircraft in the SFPA.

The business mechanism by which the various rights and responsibilities are allocated to enable operation of the SFPA comprises a series of agreements. The first agreement is a lease agreement 26 from the fractional owners group 12 to the carrier unit 20. The lease agreement 26 is conditioned upon execution of a first charter 28 between the carrier entity 20 and the charter entity 22, and upon execution of a second charter 30 between the charter entity 22 and the fractional owners group 12.

The lease agreement 26 grants a leasehold in the first fractionally owned aircraft to the carrier entity 20. As a result, the carrier entity 20 may maintain and operate the aircraft on scheduled flights.

The first charter 28 transfers scheduling and booking control of the first aircraft to the charter entity 22. Thus, in accordance with the first charter 28, the carrier entity 20 agrees to operate the aircraft on scheduled flights as determined by the charter entity 22, and to admit passengers to the aircraft in accordance with instructions of the charter entity 22. In exchange, the charter entity 22 agrees to pay carrier fees for the services of the carrier entity 20. The carrier fees include operating costs, fixed costs, and a management fee.

In general, the carrier fees may be broken down on a per aircraft basis:

C_Fee=Op_cost+Fixed_cost+Mgmt_fee, where C_Fee is the per aircraft carrier fee charged to the charter entity 22, Op_cost is the operating cost of a single aircraft, Fixed_cost is the fixed cost of a single aircraft and Mgmt_fee is the overhead charge of the carrier entity 20.

Operating costs then include the following, on a per-hour of flight time basis:

Op_cost/hr=fuel/hr+maintenance/hr+landing/hr+trvl_exp/hr+position/hr, where fuel/hr is the cost of fuel per flight hour, maintenance/hr is the cost of maintaining the aircraft per flight hour, landing/hr is the landing cost per flight hour, and trvl_exp/h is equal to the flight crew travel expenses per flight hour, and position/hr is the marginal fuel and other operating costs for nonflight time taken to position the aircraft for use, wherein such costs are estimated as a cost per flight hour. There may in some cases be additional costs, such as navigational fees for international flights, as well as others. Any such additional operating costs may be added to the above equation on a per-hour basis.

Thus, for example, if a particular aircraft is determined by the charter entity 22 to fly between New York and Chicago two hundred times per year, and it is estimated that a single round trip involves four hours of flight time, then the Op_cost/hr may be readily determined. In particular, the fuel/hr would be the amount of fuel consumed in a single round trip between New York and Chicago, divided by four hours. Similarly, the landing fees involved in a single round trip may be divided by four to obtain the value of landing/hr. The maintenance fees for an aircraft, both for engine and air frame, are typically incurred as a function of flight hours, and thus maintenance/hr may readily be determined. The value of trvl_exp per hour will depend on whether the crew is required to stay over away from "home" during the normal flight schedule. If so, then such expenses incurred for the entire round trip would be divided by the four hour round trip to obtain trvl_exp/hr.

Finally, the positioning fees consist of the fuel and other costs associated with non-passenger movement of the aircraft. In particular, the aircraft may be housed in a location away from the airport in which it bases its flights. For example, a New York to Chicago flight aircraft may actually be housed in Delaware for cost reasons. The positioning flight from Delaware to New York incurs operating costs. Such costs have been estimated to accrue at approximately 35% of the rate of normal flight operating costs, per hour. Moreover, it is estimated that approximately one hour of positioning occurs for each flight. Accordingly, for the New York to Chicago trip, the position/hr costs may be estimated as:

$$\text{position/hr}=(0.35)(1/4)(\text{Fuel/hr}+\text{maintenance/hr}+\text{landing/hr}+\text{trvl}_{\_exp/hr})$$

Once the Op_cost/hr is determined, the total Op_cost may be determined by multiplying Op_cost/hr by the number of hours of flight time. Thus, for example, if the aircraft makes two hundred roundtrips between New York and Chicago (four hours each), the total annual operating cost is Op_cost-flir(200)(4).

Fixed costs (Fixed_cost) may be determined as a function of the following: Insurance costs (hull, extended liability, and legal liability), crew salary and benefits, recurring training fees, recurring updates to aircraft mechanicals, electricals and software, uninsured damage, navigation chart service, recurring interior/exterior refurbishment, weather service, and computerized maintenance programs. Again, additional fixed fees may be incurred. Such fixed costs are incurred regardless of flight time, and thus may simply be determined on an annual basis.

Mgmt_fee constitutes the management/profit margin costs of the carrier 20. Typically, such charge may consist of a flat monthly fee per aircraft.

Accordingly, the value C_fee paid by the charter entity 22 to the carrier entity 20 may be determined as described above. In particular, the annual Op_cost value may be determined by calculating the hourly operating costs and multiplying the cost by the annual flight hours. Mgmt_fee and Fixed_cost may readily be annualized. The resulting annualized C_fee may then be paid on a monthly basis.

The second charter 30 defines the relationship between the charter entity 22 and each fractional owner 15*x*. The second charter 30 obligates the charter entity 22 to permit usage of one or more fractionally owned aircraft of the SFPA by each fractional owner 15*x* in exchange for a periodically payable management fee. In the exemplary embodiment described herein, the second charter 30 also defines for each fractional owner 15*x* a passenger-hour allocation, typically defined as an annual allocation. In a preferred embodiment, the passenger-hour allocation is based at least in part on the size of the fraction owned by the fractional owner 15*x*. Thus, in the example shown in Table 1, the fractional owner 15*f* would have a much larger annual passenger-hour allocation than the fractional owner 15*d*. Each passenger-hour allocated entitles the fractional owner 15*x* participation in a flight by one passenger for one hour. Thus, in the New York to Chicago example described above, flying two persons round trip would require the use of eight passenger-hours.

The charter entity 22 preferably determines the passenger-hour allocations in the following manner. First, the charter entity 22 defines a total passenger-hour allocation for the entire aircraft on an annual basis. The total passenger-hour allocation per aircraft is defined as the total flight-hour allocation per aircraft multiplied by the per-flight passenger allocation per aircraft. The charter entity 22 then distributes the total passenger-hour allocation in accordance with the fraction owned by each fractional owner 15*x*. Thus, even though the fractional owner 15*x* is not necessarily required to use its passenger hour allocation on its own fractionally owned aircraft, the use allocated to the fractional owner 15*x* is nevertheless based on its fraction owned.

By way of example, if the annual flight time allocation for the first aircraft is eight hundred flight hours, and the charter entity 22 defines a per-flight allocation of twenty passengers, then the total annual passenger hour allocation for the first aircraft is 16,000 hours, with fractional owner 15*f* receiving an allocation of 8,000 passenger hours and fractional owner 15*d* receiving 250 passenger hours. As discussed above, however, the fractional owners 15*d* and 15*f* need not use all of their allocation on the first aircraft.

In accordance with one aspect of the present invention, the charter entity 22 allocates a relatively small number of passengers for each flight, even if the aircraft is a jumbo jet. For example, the charter entity 22 preferably allocates twenty passengers on a large jumbo jet such as the Boeing BBJ-2. Such a small passenger allocation with respect to the size of the aircraft helps ensure complete comfort and productivity of the passengers. In particular, one feature of the invention is that it provides a level of comfort and productivity aboard flight unrivaled by current commercial flights, even in first class. By allocating only twenty passengers per flight, the aircraft may be outfitted with comfortable seating furniture, as opposed to mere rows of seats, and may further include conference rooms, computer work stations and other productivity-oriented features.

It is further contemplated that the per-flight passenger allocation should be significantly less than the maximum occupancy that is acceptable. In other words, a twenty passenger allocation takes into account that several more passengers must be able to be productive and comfortable on any particular flight. The additional capacity over and above the allocated number of passengers allows for uneven flight usage. For example, in real world conditions, one flight may have twenty passengers while another has twelve. Thus, by allocating twenty passengers per flight, the charter entity 22 factors in a larger acceptable maximum number of passengers, for example, thirty-two.

Thus, to determine the per-flight passenger allocation, the charter entity 22 works backwards from the maximum acceptable per-flight passenger capacity. To this end, once the aircraft is designed for optimal productivity and comfort, the maximum sustainable occupancy should be determined. The charter entity 22 should then determine the per-flight passenger allocation by multiplying the maximum sustainable occupancy by a fractional amount, preferably between 0.50 and 0.75. If the per-flight passenger allocation is too close to the maximum acceptable capacity, then the availability of flights will diminish accordingly, resulting in reduced utility to the fractional owners. Contrariwise, if the per-flight passenger allocation is too low (i.e. far less than the maximum acceptable capacity), then the use allocation per fractional owner will correspondingly diminish, thereby reducing the cost-effectiveness of the SFPA.

Thus, each fractional owner 15*x* receives through the second charter agreement 30 rights to participate in flights having luxurious amenities and an average of twenty passengers. It will be appreciated that the per flight passenger allocation may be a number other than twenty, and will depend upon the aircraft used, and the level of comfort desired. Thus, for example, if the per flight passenger allocation is fifty, then the total passenger-hour allocation for the aircraft would increase greatly, and as a result, each fractional owner 15*x* would receive a much higher passenger-hour allocation per fraction owned. However, the comfort level of the aircraft flight would be correspondingly diminished, assuming the same sized aircraft.

It is noted that in accordance with another optional aspect of the present invention, the number of flight hours per aircraft is significantly less than that typical of commercial airlines. For example, it is envisioned that each aircraft will be limited to approximately eight hundred hours of operation on behalf of the fractional owners 15*x*. The relatively limited use reduces annual maintenance costs, prolongs the life of the aircraft, and helps retain the capital value of the aircraft for the fractional owners 15*x*.

In exchange for the passenger-hour allocation and other benefits, the second charter 30 requires each fractional owner 15*x* to pay a management fee (Mgmt_fee) to the charter entity 22. The Mgmt_fee is based on, and is preferably proportional to, the passenger-hour allocation for each fractional owner 15*x*.

In one preferred business model, the charter entity 22 determines the Mgmt_fee by generating an hourly cost unit, hourly_fee, and then multiplying the hourly_fee by the number of passenger-hours allocated to each fractional owner 15*x*. The hourly_fee is preferably based on the carrier fee C_fee per passenger-hour and a charter service fee. Thus, the Mgmt_fee is Mgmt_fee(*FO_x*)=hourly_fee*passenger-hour_allocation(*FO_x*), where FO_x is the fractional owner 15*x*, and the passenger-hour_allocation (FO_x) is the passenger-hour allocation of the fractional owner 15*x*, and hourly_fee is given by the following:

hourly_fee=C_fee/(total passenger-hour allocation)+service fee where total passenger-hour allocation is the total passenger-hour allocation of an aircraft (flight hours allocated multiplied by the per-flight passenger allocation, discussed further above), and service fee is the service fee/margin added by the charter entity 22. Thus, in accordance with this embodiment of the present invention, the charter entity 22 ensures viability by obtaining sufficient payments to cover the operation of the aircraft without requiring any ticket revenues.

In addition, the second charter 30 requires each fractional owner 15*x* to pay an additional occupancy charge per passenger-hour actually used. Thus, while the Mgmt_fee is paid by the fractional owner 15*x* based on allocation, the occupancy fee is paid based on actual use. Thus, at least some savings result from non-use of the passenger hour allocation.

Figure 3:
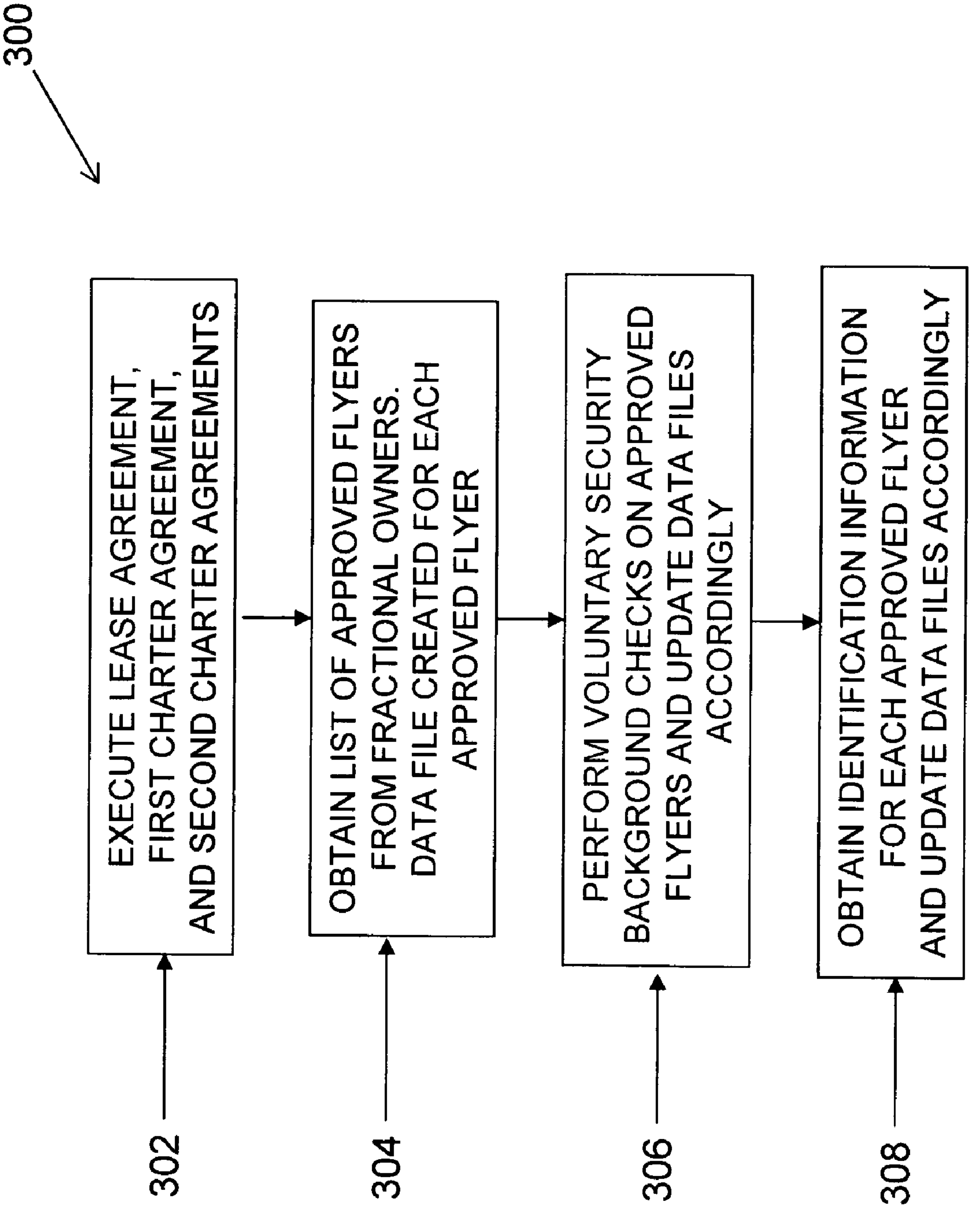
FIG. 3 shows a flow diagram of the operations involved in transitioning the aircraft ownership by fractional owners into the implementation of a shared fractional private airline.
Figure 4:
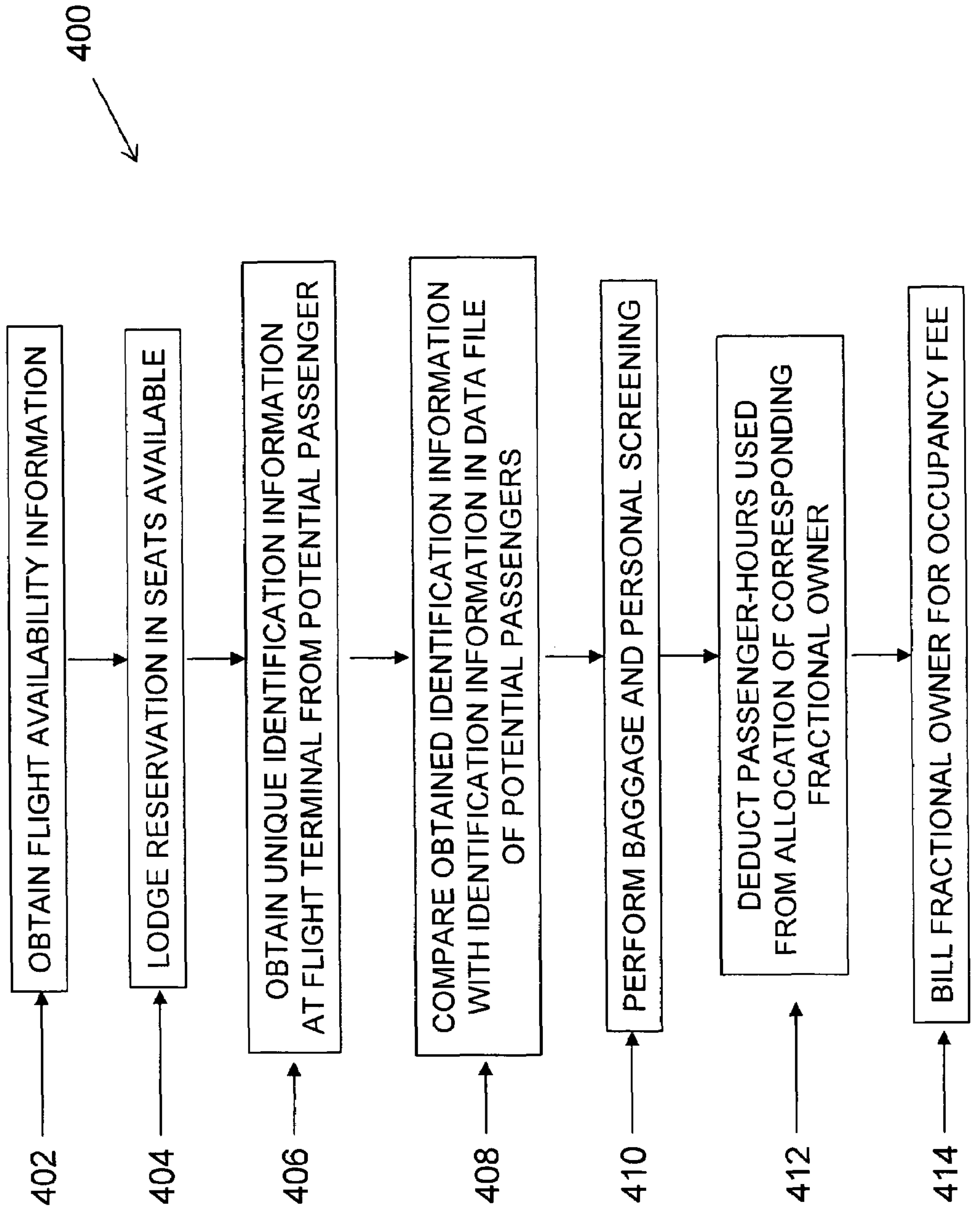
FIG. 4 shows a flow diagram of the operations involved in executing an exemplary flight transaction on a shared fractional private airline.

FIGS. 2 through 4 show flow diagrams that provide further detail of interaction of the elements of FIG. 1. FIG. 2 shows the operations involved in the purchase of an aircraft by the fractional owners groups 12 and 14. FIG. 3 shows the general operations of the SFPA. FIG. 4 shows an exemplary set of operations involved in participating in a scheduled flight of a fractionally owned aircraft by a party under the authorization of a fractional owner.

Referring to FIG. 2, the flow diagram 200 shows an exemplary set of operations performed by the sales and management entity 16 of FIG. 1 in facilitating the purchase of aircraft by the fractional owners groups 12 and 14. The sales and management entity 16 negotiates and coordinates the transaction in exchange for a mark-up on the aircraft price. For example, the mark-up may merely comprise all or a part of the value of a quantity discount obtained by the sales and management entity 16 for facilitating the sales of multiple aircraft.

In general, in step 202, the sales and management entity 16 obtains a binding proposal from the source of aircraft 18 identifying a maximum cost involved for a purchase of one or more aircraft. The sales and management entity 16 further obtains an estimate for finishing the aircraft, as will be discussed below, from a finishing center. The finishing cost estimate may be based on engineering and/or interior design plans generated by design and engineering professionals.

By obtaining a binding proposal for the aircraft costs, the sales and management entity 16 may readily identify a sales price to the fractional owners with a reduced risk of loss. Specifically, the sales and management entity 16 may base the sales price to the fractional owners on 1) the maximum cost identified in the binding proposal from the source of aircraft 18, 2) the additional cost associated with finishing operations on the aircraft, and 3) a margin for the sales and management entity 16. By defining the sales price based on the binding proposal and finishing cost estimates, and as long as the sum of the fractions purchased by the fractional owners is equal to one, the sales and management entity 16 will obtain a marginal income on the sale of each aircraft. Moreover, by executing a binding proposal, the sales and management entity 16 may "lock in" the price without actually committing to a purchase of the aircraft. Thus, one advantage of the embodiment described herein is the relatively low risk business model of the sales and management entity 16.

In any event, in step 204, the sales and management entity 16 markets one or more aircraft to potential fractional owners. In a preferred embodiment, each aircraft is marketed in connection with a particular air route or city-pair. For example, the first fractional aircraft may be marketed to the first fractional owners group 12 for the New York to Los Angeles route. In this manner, each fractional owner 15*x* ensures that at least the route of its fractionally-owned aircraft will be serviced by the SFPA. Accordingly, even if only a few routes are serviced by the SFPA, the fractional owner 15*x* may ensure the usefulness of its fractional ownership by purchasing a fraction for an aircraft allocated to a route frequently traveled by the fractional owner 15*x*. As the SFPA grows to a large number of aircraft and more flight routes become available, it may not be as necessary to tie each fractional aircraft sold to a particular route. In any event, as each fractional owner 15*x* purchases a fraction, the sales and management entity 16 places the purchase proceeds in an escrow account in step 206.

Then, in step 208, the sales and management entity 16 determines whether an entire aircraft has been subscribed. An entire aircraft has been subscribed when the total of fractions sold for that aircraft equals one or nearly one. Continuing with the example illustrated in Table 1, after the purchases by fractional owners 15*a*, 15*b*, 15*c*, 15*d*, 15*e* and 15*f*, the sum of the fractions owned (see Table 1) is one. As a result, the first aircraft would be fully subscribed.

If in step 208 it is determined that an aircraft has been fully subscribed, then the sales and management entity 16 performs step 210. If, however, in step 208 it is determined that an aircraft has not yet been fully subscribed, then the sales and management entity 16 returns to step 204. It will be appreciated that if the aircraft is not fully subscribed by a predetermined time limit, the fractional purchasers of the undersubscribed aircraft would be entitled to a refund of their purchase money from escrow.

In step 210, the sales and management entity 16 executes a purchase order for the subscribed aircraft from the source of aircraft 18. In step 210, a portion of the escrow account equal to the final cost (from the source of aircraft 18) is provided to the source of aircraft 18. The funds maybe provided to the source of aircraft 18 in stages, as is typical for aircraft sales. It is noted that the sales and management entity 16 may proceed with steps 210 and 212 while it continues to sell fractions of other aircraft in step 204.

After step 214, the purchased aircraft is provided to a finishing center. In particular, if the source of aircraft 18 is an aircraft manufacturer, then the source of aircraft 18 provides a "green" aircraft in exchange for the purchase price. A green aircraft is a functionally operational aircraft that has little or no aesthetic improvements or amenities. As a consequence, the green aircraft requires external as well as internal finishing. Various aircraft finishing centers exist throughout the United States. Similarly, if the source of aircraft 18 is an owner of used aircraft, then the source of aircraft 18 provides an aircraft that typically requires substantial internal and external refinishing. In either event, in step 214 the sales and management entity 16 directs the aircraft to one of the finishing centers to have the aircraft finished in accordance with the specifications for the SFPA aircraft.

In particular, the sales and management entity 16 preferably specifies that each aircraft is finished in a manner consistent with the level of comfort and productivity intended for the SFPA aircraft. To this end, the finishing operation includes retaining the services of an interior designer and/or design engineer, which may be entities separate from the finishing center. It is envisioned that the aircraft will be furnished with couches, comfortable chairs, conference room and/or conference area facilities, work stations, sleeping quarters and/or sleeping furniture, internet, telephone and other productivity; entertainment and comfort-related facilities are installed within the aircraft.

The sales and management entity 16 transfers funds from the escrow account to the finishing center (and, if appropriate, the interior designer and/or design engineer) in exchange for the finishing operation.

Once the finishing center has completed the finishing operations in step 214, the aircraft is typically transferred to the care of the carrier entity 20, subject to the execution of the lease agreement 26 discussed further above. The sales and management entity 16 then transfers the remaining escrow money (as allocated for that aircraft) to its own accounts in step 216 as payment for its services.

It is noted that the sales and management entity 16 may actually purchase the aircraft from source of aircraft 18 and then resell the aircraft to the fractional owners 15*x*. Alternatively, the sales and management entity 16 may simply act as an agent for the sale of the aircraft form the source of aircraft 18 to the fractional owners. The above described steps may readily be modified to suit either case.

FIG. 3 shows a flow diagram 300 of the activities involved in transitioning the aircraft ownership by the fractional owners, for example, the fractional owners 15*a* through 15*g*, into the use of the fractionally-owned aircraft by the fractional owners.

Figure 5:
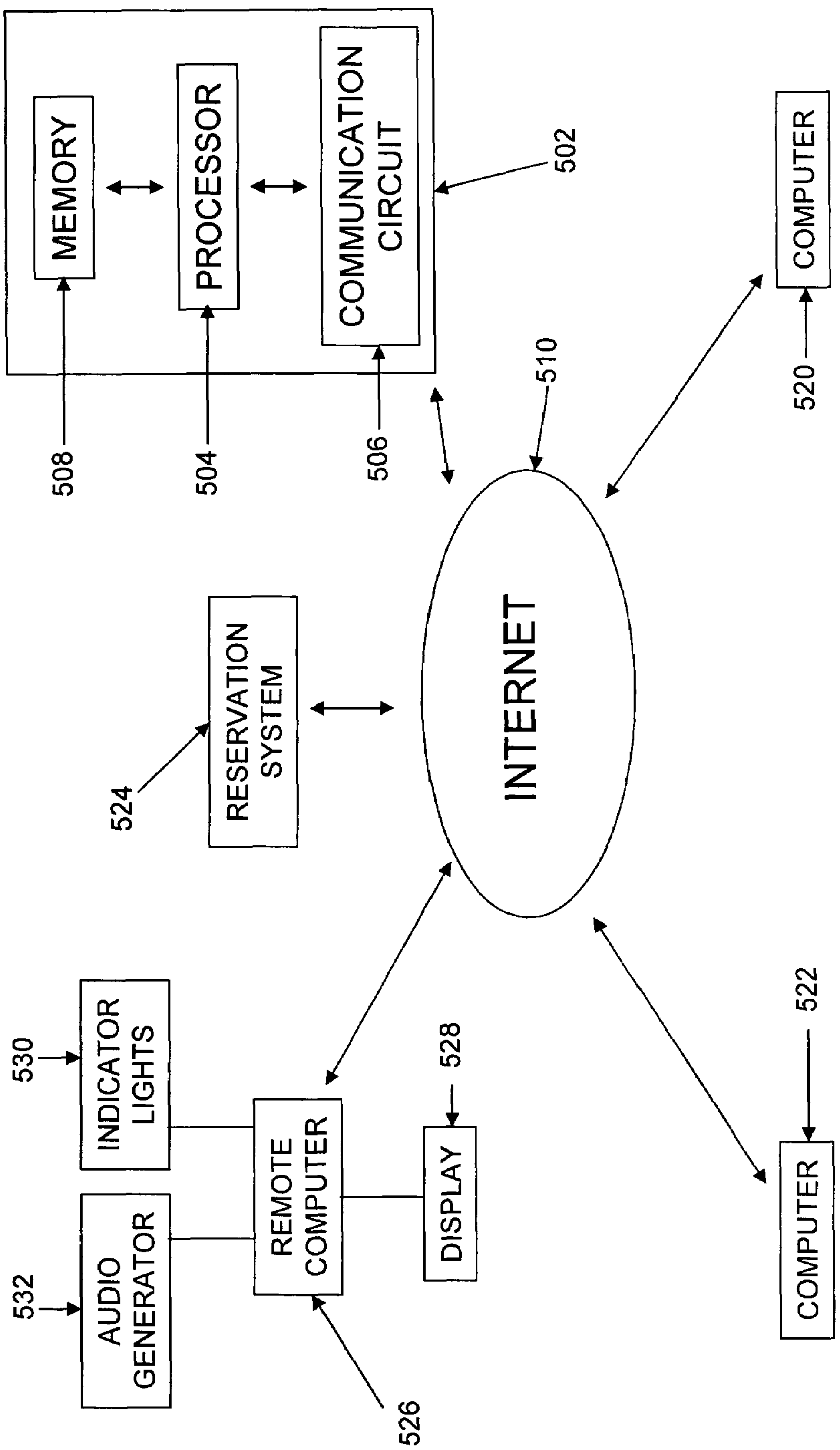
FIG. 5 shows an exemplary arrangement of a system capable of carrying out many of the computer operations associated with the operations of FIGS. 1, 3 and 4.

Many of the operations involved in FIG. 3 (as well as FIG. 4, discussed below) preferably involve a networked computer system. FIG. 5 shows an exemplary arrangement of a system capable of carrying out many of the computer operations of the invention described herebelow. With reference to FIG. 5, a central server system 502 includes a processing circuit 504, a communication circuit 506, and a memory circuit 508. The processing circuit 504 may be one or more processors of a general purpose computer, programmed to, among other things, operate as a database server and to otherwise carry out the operations attributed to the server system 502 in this disclosure.

The communication circuit 506 is a circuit operable to enable communication between the processing circuit 504 and other computers or elements via the internet 510. However, it will be noted that communication networks other than the internet 510 may be employed. Those of ordinary skill in the art may readily determine the appropriate communication circuit or circuits necessary to enable communication on any number of networks.

The memory circuit 508 includes any combination of random access memory, magnetic or optical disk memory, tape memory, or other volatile and non-volatile memory devices, such as those normally associated with a general purpose computing device having the capability to operate as a database server.

Through the communication circuit 506, the central server system 502 is configured to communicate to one or more various remote computers 520 and 522 as well as a reservation system 524. The remote computers 520 and 522 may suitably be general purpose, internet-capable general purpose computers which may be a part of one or more other networks. In the embodiment described herein, the central server system 502 may also communicate with a terminal security computing system 526 through the Internet 510, or alternatively, through a private network such as a LAN. The reservation system 524 is a computer and software system that tracks flight reservations and flight availability. Many types of reservation systems are known in the art.

The system shown in FIG. 5 will be referenced from time to time during the description of the operations of FIGS. 3 and 4. It will be appreciated that the system shown in FIG. 5 is merely illustrative of the basic functional components. Implementation of the functions may incorporate further computing devices and systems.

Referring again to FIG. 3, the first step towards enabling use of the fractionally owned aircraft by the fraction owners is the execution of the various agreements discussed above in connection with FIG. 1. In particular, in step 302, the lease agreement 26, the first charter 28 and the second charter 30 are executed by the appropriate parties as discussed above in connection with FIG. 1. The lease agreement 26 transfers a leasehold interest in the aircraft from the fractional owners group (e.g. fractional owners group 12) to the carrier entity 20. The first charter 28 defines the terms of the relationship between the carrier entity 20 and the charter entity 22. The second charter 30 defines the rights of each fractional owner 15*x* to participate in flights of the fractionally owned aircraft of the SFPA and defines the costs associated with those rights.

Thereafter, in step 304, each fractional owner 15*x* submits a list of approved flyers associated with the fractional owner 15*x*. For example, if the fractional owner 15*a* is a corporation, the fractional owner 15*a* may submit a list that identifies the corporate officers, high level management, clients, other guests or other employees of the corporation. Such approved flyers would then be eligible to participate in the flights of the fractionally owned aircraft of the SFPA at the "expense" and under the authority of the fractional owner 15*x*.

Referring to FIG. 5, the fractional owners 15*x* may suitably submit their list of approved flyers via the internet 510. For example, consider a situation in which the fractional owner 15*a* has access to the computing system 520. The fractional owner 15*a* obtains access to a website maintained by the central server system 502 via the internet 510 and enters a data list identifying approved flyers. The processing circuit 504 thereafter forms a data file associated with the approved flyer. The data file will be used to associate security and identification information regarding the passenger. The processing circuit 504 stores the data file in the memory circuit 508.

It is noted that the central client server 502 or another similar computing system also maintains a data file associated with the fractional owner 15*a*, for the purpose of tracking usage of passenger-hours, payments, and other data.

Referring again to FIG. 3, in step 306, each of the approved flyers then voluntarily submits to a background security check. In particular, to ensure air travel at a relatively high safety level, each potential passenger (approved flyer) of the fractionally owned aircraft must pass a background security check. It is preferable that the background security check be extensive, such as that ordinarily required to obtain access to low level classified government information. As a result, each passenger flying on any flight of the SFPA has passed a background security check, thereby enhancing the safety of each passenger. The results of the background security check of each passenger may be stored in the data file associated with the approved flyer in the memory 508. To this end, the security background check information may be entered either through the internet 510 or directly into the central server system 502.

It will be appreciated that in some embodiments, data files may only be created for those approved flyers that also pass the security background check. In other embodiments, data files of approved flyers that fail the security background check may also be retained.

In step 308, identification information is generated for each approved flyer. In particular, unique personal identification data is obtained from each approved flyer and stored in the data file associated with the approved flyer in the memory 508. The unique personal identification data is later employed to verify the identification of each person attempting to board a flight on a fractionally owned aircraft. Such verification is discussed further below in connection with FIG. 4.

The unique personal identification data preferably comprises biologically-oriented identification data, such as retinal scan information, facial scan information, fingerprint information, or other unique biological identification information. Alternatively, or in addition, the unique personal identification data may include identification information encrypted and stored within a Smart Card-type device. Other unique personal identification information may also be employed.

Thus, for example, in step 308, each approved flyer may be required to arrange for retinal scan. After the retinal scan is performed, the retinal scan data is provided via the internet 510 (or through some other means) to the central server system 502. The central server system 502 stores the retinal scan data in the data file for the approved flyer in the memory 508.

Referring again to FIG. 3, once steps 306 and 308 are successfully carried out for approved flyers, the approved flyers are eligible to participate in flights on the fractionally owned aircraft of the SFPA.

FIG. 4 shows a flow diagram 400 of the steps carried out in connection with executing an exemplary flight transaction on the SFPA. Reference to elements of FIGS. 1 and 5 will be made during the description of FIG. 4. FIG. 4 will be described in relation to an example in which two approved flyers, AP_1 and AP_2, obtain reservations for and board a flight from New York to Chicago on January 15th. AP_1 and AP_2 are associated with the fractional owner 15*a*. In other words, AP_1 and AP_2 fly using the passenger-hour allocation belonging to fractional owner 15*a*.

In step 402, a party authorized by the fractional owner 15*a* obtains information from the charter entity 22 regarding availability of seats on a New York to Chicago flight in the SFPA system for January 15th The authorized party may suitably be a travel professional used by the fractional owner 15*a*, the parties AP_1 and AP_2 themselves, or another agent of the fractional owner 15*a*. To obtain seat availability information, the authorized party may log into a website maintained at the reservation system 524. Alternatively, the authorized party may call by telephone or use some other information source.

If two seats are available, then in step 404 the authorized party books two seats for AP_1 and AP_2 on the flight. The reservation system 524 first verifies that the authorized party is authorized to reserve flights on behalf of the first fractional owner 15*a*. The reservation system 524 may suitably communicate with the central server system 502 to perform such verification, or may do so locally.

Steps 406 and 408 thereafter take place on the day of flight. In step 406, the identification of the two people purporting to be AP_1 and AP_2 occurs at or near the boarding gate for the flight. To this end, each of persons purporting to be AP_1 and AP_2 provides identification data that is checked against the unique identification data stored in the data files associated with AP_1 and AP_2. For example, if the data obtained in step 308 of FIG. 3 was facial scan data, then in step 406 a facial scan is performed on each of the persons purporting to be AP_1 and AP_2.

Then, in step 408, the results of the scan measurement performed in step 406 are compared to the facial scan data in the data file stored in the memory 508 to ascertain the identify, of AP_1 and AP_2. To this end, the results of the scan measurement may be communicated from a computer system at the airport, e.g. the terminal security computing system 526, to the central server system 502. The processing circuit 504 then compares the received measurement scan data with the scan data in the relevant approved flyer data file in the memory 508. The processing circuit 504 then communicates the results of the comparison back to the computing system 526 at the airport. The computing system 526 thereafter communicates the results to personnel at the airport either visually via a display 528 or indicator lights 530, or audibly via an audio generator 532.

Assuming that AP_1 and AP_2 are successfully verified in step 408, then in step 410, AP_1 and AP_2 are subject to baggage and personal safety screening at a level consistent with or greater than security measures dictated by governmental regulations. It is noted that such screening may alternatively occur at least in part prior to the identification verification in step 408.

Assuming that AP_1 and AP_2 successfully complete steps 406, 408 and 410, then AP_1 and AP_2 are permitted to participate in the flight from New York to Chicago. At some point, in step 412, the passenger hour allocation for fractional owner 15*a* is reduced in amount commensurate with the flight taken by AP_1 and AP_2. Thus, if the New York to Chicago flight has a two hour duration, then the passenger-hour allocation of the fractional owner 15*a* is reduced by four (two passengers at two hours each). A similar deduction would occur when AP_1 and AP_2 board the return flight.

The passenger-hour allocation for each fractional owner, as well as the corresponding deductions thereto, are maintained and tracked on a computing system. To this end, such information may be maintained and tracked on the reservation system 524, the central system server 502, or another computer such as the computer 522. In any event, it is preferable if deduction and allocation information in the appropriate computing device may be updated via the Internet 510 or other network.

It is noted that the fractional owner 15*a* will further be billed a per-hour occupancy charge for the passenger hours consumed by AP_1 and AP_2 in step 414. Such billing may occur on a monthly basis or otherwise in arrears. As discussed above, the occupancy charge is in addition to the monthly management fee paid by the fractional owner 15*a*.

The above system thus provides for fractional ownership of aircraft that is otherwise regularly scheduled for normal flights. By contrast, prior fractional ownership systems were specially scheduled custom flights, thereby reducing the possibility of concurrent use by multiple owners. Without providing for use by multiple owners, the availability (use allocation) of the aircraft is greatly diminished.

Moreover, the present invention allows for the cost of any particular flight of a fractionally owned aircraft to be divided among multiple fractional owners. By contrast, prior fractional ownership systems could not spread costs because of current federal regulations. However, the arrangement described herein allows for cost sharing or splitting on individual flights of the aircraft. It will be appreciated that in the exemplary embodiment described herein, the cost sharing does not necessarily require that the entire cost of each flight be split among those owners who use the flight. In other words, each fractional owner 15*x* "pays" (via its use allocation) for the number of its passengers that participate in the flight, regardless of how many other fractional owners participate. However, the entire system is set up to allow multiple fractional owners to participate in flights, each paying via its use allocation, and thereby effectively sharing costs.

The features of the present invention result in an airline that provides flight service of unparalleled space, luxury and productivity, by keeping the number of passengers relatively low, even on a jumbo jet. Moreover, the features of the present invention provide such flight service for a price that is competitive with both first class commercial airline travel and prior art fractional ownership programs.

Another feature of the present invention is that with multiple fractional owners, the SFPA can provide the scheduling and route availability convenience of a commercial airline, while avoiding the possibilities of economic loss associated with commercial airlines. In particular, under the system described above, each fractional owner 15*x* precommits to a certain level of usage based on its fraction owned. Thus, whether or not the fractional owner 15*x* actually consumes its use allocation, the management fees are paid, and the aircraft purchase price is paid. As a result, various entities that operate the SPFA, namely, the charter entity 22 and the carrier entity 20 have a greatly reduced risk of unprofitability and/or insolvency due to low ridership.

In one alternative of the present invention, each fractional owner 15*x* is provided an incentive for using its own fractionally-owned aircraft. For example, the use allocation of each fractional owner 15*x* may be consumed at a different, lower rate when used on the fractional owner's own aircraft. Alternatively, occupancy fees may be reduced or waived. Thus, while each fractional owner 15*x* is still permitted to participate in the flight of any fractionally owned aircraft in the SFPA, each fractional owner 15*x* benefits in some manner from using its own aircraft.

Such an incentive provides a motivation for each fractional owner 15*x* to purchase fractions of aircraft assigned to air routes (e.g. city-pairs) frequently traveled by the fractional owner 15*x*. This motivation will tend to optimize the number of routes served, and the frequency of flights on each route, because the demand for particular routes will become more apparent through the incentive for each fractional owner 15*x* to fly the route of its own aircraft. To this end, it is noted that the incentive need not be limited to the fractional owners particular aircraft, but instead may extend, as least partially, to all flights on the same route as that served by the fractional owner's aircraft.

In another variation, provision may be made for fractional owners to participate in the SFPA between the time that the "green" aircraft is purchased from the source of aircraft 18 and time when their aircraft becomes available for passenger flights. To this end, one or more existing aircraft may "lend" a flight-hour allocation to the new, unfinished aircraft. For example, an existing fractionally-owned aircraft may normally carry an eight hundred hour annual flight hour allocation. However, to service fractional owners awaiting the finishing of a new fractionally-owned aircraft, the existing aircraft may increase its annual flight hour allocation by two hundred to accommodate the new owners. Then, when the new aircraft is placed into service, the existing aircraft reduces its flight hour allocation to below its normal allocation, with the difference being made up by the new aircraft. When the existing aircraft has "recovered" the extra flight hours allocated while the new aircraft was unavailable, the flight hour allocation of the existing aircraft is returned to eight hundred. In this manner, new fractional owners may participate immediately in the SFPA, even though their aircraft is not yet available, without taxing the flight-hour usage of aircraft owned by other parties over the long term.

Alternatively, in order to provide for immediate participation by fractional owners, a separate aircraft may be chartered to serve the route assigned to the new, unfinished, fractionally owned aircraft. In still another alternative, an arrangement may be made with one or more existing airlines to reserve a predetermined number of first class seats on particular flights to accommodate the fractional owners. Such alternative arrangements may be funded from the new fractional owners management fees provided to the charter entity 22. One advantage of providing for immediate participation by new fractional owners is that the new fractional owners receive near immediate utility out of the significant monetary outlay associated with the purchase of the new aircraft. The above described arrangements provide for such immediate utility without requiring the sales and management entity 16 to purchase and finish aircraft prior to obtaining purchase commitments, thereby assuming the risk that an aircraft will not sell.

It will be appreciated that the above described embodiments are merely exemplary, and that those of ordinary skill in the art may devise their own implementations that incorporate the principles of the present invention and fall within the spirit and scope thereof. By way of example, it will be appreciated that two or more of the entities shown in FIG. 1 may be combined into one entity. For example, the sales and management entity 16 and the charter entity 22 may be combined into a single entity. Likewise, the carrier entity 20 and the charter entity 22 may be combined, thereby eliminating the need for the first charter 28. Moreover, individual activities of the various entities may be shifted to other entities. For example, the sales and management entity 16 may collect the management fees from each fractional owner 15*x*, thereby necessitating an additional agreement with the charter entity 22 as well as each fractional owner 15*x*.

U.S. patent application Ser. No. 10/056,147, filed Jan. 24, 2002 is hereby incorporated herein in its entirety.

The invention claimed is:

1. An apparatus comprising:

a. a memory;

b. a communication device, wherein the communication device includes a visible indicator;

c. a processing circuit operable to formulate and store in the memory a data record associated with a first passenger, the data record including an indication that the first passenger has passed a background check, the data record further including facial scan identification data associated with the first passenger;

receive retinal scan measurement data associated with a person, compare the facial scan measurement data to the retinal scan identification data in the data record, and;

provide an indication signal to the communication device, the communication signal operable to cause the communication device to provide human-perceivable indicia representative of the result of the comparison.

2. The apparatus of claim 1 wherein the processing circuit includes more than one processor connected via a network.

3. The apparatus of claim 1 wherein the communication device includes a visible display.

4. The apparatus of claim 1 wherein the communication device includes an audible sound generator.

5. The apparatus of claim 1 wherein the processing circuit is further operable to associate the person with a first fractional aircraft owner.

6. The apparatus of claim 2 wherein the more than one processor is connected via the Internet.

* * * * *